United States Patent [19]

Waldron

[11] 4,245,168
[45] Jan. 13, 1981

[54] INTEGRATABLE DRIVER FOR LIQUID CRYSTAL DISPLAYS AND THE LIKE

[75] Inventor: Wesley K. Waldron, Scotia, N.Y.

[73] Assignee: General Electric Company, Schenectady, N.Y.

[21] Appl. No.: 930,731

[22] Filed: Aug. 3, 1978

[51] Int. Cl.² .................. H03K 17/60; G02F 1/13; H03K 5/08
[52] U.S. Cl. .................. 307/270; 307/237; 340/784; 350/332
[58] Field of Search .......... 307/237, 270; 340/784, 340/785, 813; 350/332, 333, 357

[56] References Cited

U.S. PATENT DOCUMENTS

| 3,613,351 | 10/1971 | Walton | 350/332 X |
|---|---|---|---|
| 3,775,693 | 11/1973 | Proebsting | 307/214 X |
| 3,846,697 | 11/1974 | Cila et al. | 307/237 X |
| 3,903,518 | 9/1975 | Hatsukano | 350/332 X |
| 3,907,405 | 9/1975 | Fukai | 350/332 |
| 3,981,004 | 9/1976 | Shimizu et al. | 350/332 X |
| 3,988,616 | 10/1976 | Shimada | 307/270 |
| 4,040,721 | 8/1977 | Kurita | 307/270 X |
| 4,045,791 | 8/1977 | Fukai et al. | 350/333 X |
| 4,060,802 | 11/1977 | Matsuki et al. | 350/333 X |

FOREIGN PATENT DOCUMENTS 1417871  12/1975  United Kingdom .................. 350/333

OTHER PUBLICATIONS

Margopoulos et al., "Combined Reference-Voltage Switch"; *IBM Tech. Discl. Bull.;* vol. 2, No. 4, pp. 77–78; 12/1959.
Gardner, "FET Off-Chip Driver Clamping"; *IBM Tech. Discl. Bull.;* vol. 16, No. 1, pp. 275–276; 6/1973.

*Primary Examiner*—Larry N. Anagnos
*Attorney, Agent, or Firm*—Geoffrey H. Krauss; Marvin Snyder; James C. Davis

[57] ABSTRACT

A solid-state driver circuit having a relatively low output impedance, for supplying proper drive voltage to a liquid crystal display cell and the like, utilizes metal-oxide-semiconductor transistors and avalanche diodes to provide a driver requiring a relatively small area to facilitate integration of a large number of driver circuits upon a single integrated circuit chip.

7 Claims, 2 Drawing Figures

INTEGRATABLE DRIVER FOR LIQUID CRYSTAL DISPLAYS AND THE LIKE

BACKGROUND OF THE INVENTION

The present invention relates to circuitry having a low output impedance for driving viewable displays and the like, and, more particularly, to a novel integratable solid-state driver for liquid crystal displays.

Liquid crystal displays are attractive for use in many applications, primarily due to the relatively low magnitudes of required driving power. However, present liquid crystal displays often contain many electrodes which must be individually driven, thereby requiring a commensurate number of display drivers. Hitherto, liquid crystal display drivers of solid-state type, having relatively few components and capable of being integrated, in low-cost manner, upon a single chip of semiconductor material, have been generally unavailable. A drive circuit for liquid crystal display cells, which is not only capable of being fabricated in a minimum of chip area and at a low cost, but which also minimizes the direct-current output (which direct-current output, if present at a non-zero level, tends to degrade the performance of the display cell with time), and has a relatively low output impedance, is desirable.

BRIEF SUMMARY OF THE INVENTION

In accordance with the invention, an integratable driver circuit, with low output impedance for energizing an electrode of a liquid crystal display and the like, includes a pair of semiconductor devices coupled between first and second voltage sources, with the display electrode coupled to the junction between the pair of devices. An avalanche diode is coupled from the electrode connection to one of the supply voltages, facilitating avalanche breakdown in the diode when the driven one of the semiconductor devices is in the "off" condition. The avalanche diodes provide a low "on" resistance and provide similar fixed voltages at each electrode in the "off" condition, whereby the D.C. voltage across the liquid crystal display cell is substantially zero. The avalanche diode impurity levels, controlling the avalanche voltage thereof, are adjusted by ion implantation or by conventional processes utilized to form the series-connected depletion/enhancement-mode transistors.

Accordingly, it is an object of the present invention to provide a novel driver circuit for a liquid crystal display electrode, and capable of being easily integratable with a multiplicity of similar circuits.

This and other objects of the present invention will become apparent to those skilled in the art upon consideration of the following detailed description taken in conjunction with the drawing.

DETAILED DESCRIPTION OF THE INVENTION

Figure 1:
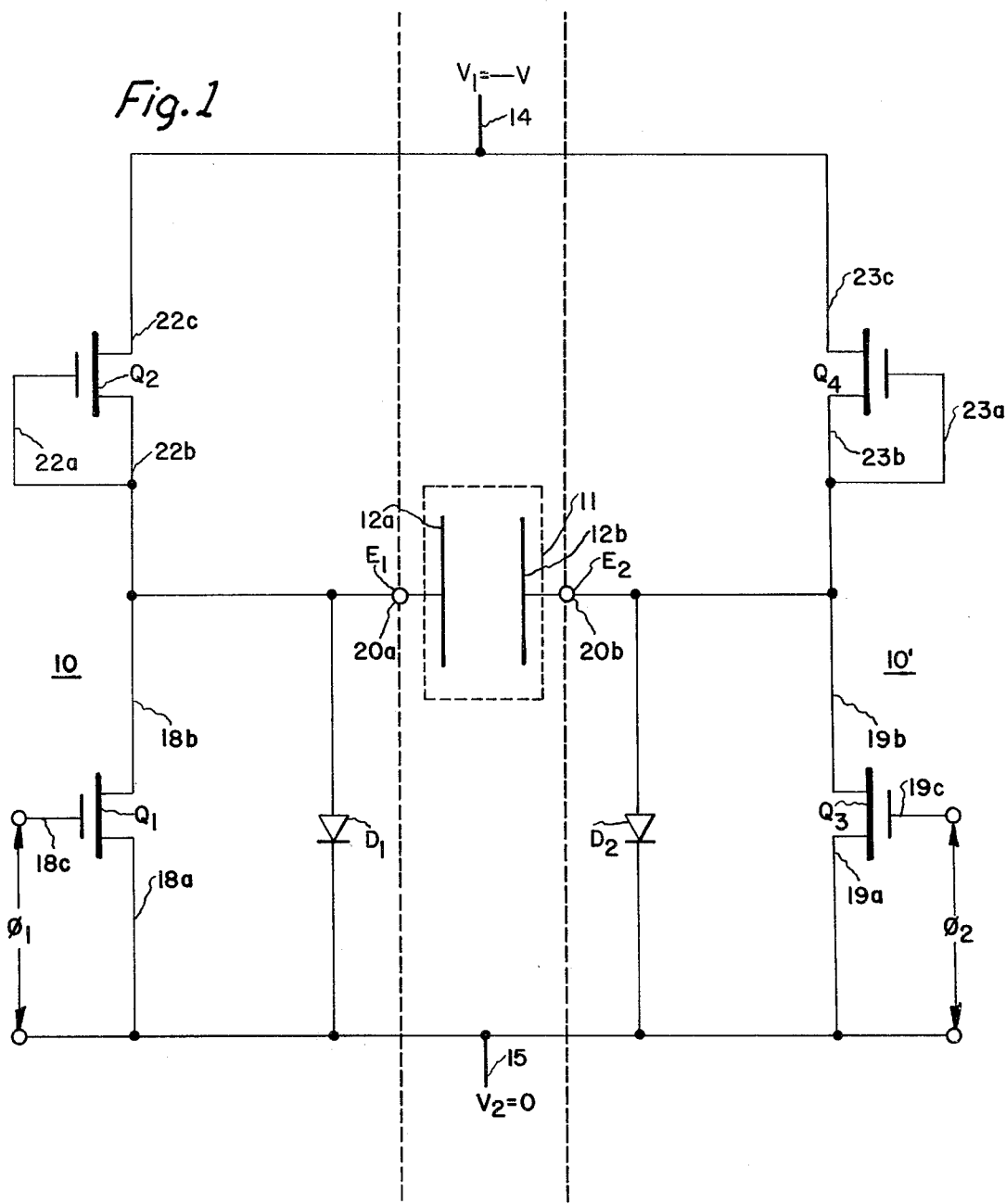
FIG. 1 is a schematic diagram of a pair of novel integratable driver circuits connected to a liquid crystal display device, in accordance with the principles of the present invention.

Referring to FIG. 1, a pair of similar integratable driver circuits 10 and 10' are provided for use in energizing a liquid crystal display 11. The display, shown schematically within the broken-line box, has at least a pair of opposed electrodes 12a and 12b, to which electrodes driving signals $E_1$ and $E_2$, respectively, are to be furnished. It should be understood that a practical liquid crystal display will contain a multiplicity of suitably sized and shaped electrodes adjacent to the viewable surface of the liquid crystal layer (such as electrodes represented by illustrated electrode 12a) and other electrodes possibly of differing size and shape adjacent to the remaining surface of the liquid crystal layer (as represented by illustrated electrode 12b). The theory and operation of liquid crystal displays are themselves known to the art and are not described in further detail herein, except to state that the D.C. voltage between opposed electrodes 12a and 12b is desirable as close to zero volts as possible (to minimize liquid crystal material effects tending to adversely affect display characteristics with time) and that each of the plurality of separate electrodes may, dependent upon the particular display, and information to be displayed, require a driving voltage of amplitude, frequency and/or phase differing from that of the driving signals applied to others of the electrodes.

Each of display driver circuits 10 and 10' are coupled between a first voltage supply bus 14, having a first potential $V_1$ thereon, and a second voltage supply bus 15, having a second potential $V_2$ thereon. Each driver circuit 10 and 10' includes a pair of active semiconductor devices $Q_1$ and $Q_2$, or $Q_3$ and $Q_4$, respectively, in electrical series connection between the first and second supply busses. In the illustrated preferred embodiment, semiconductor devices $Q_1$–$Q_4$ are transistors of the MOS type, with P-MOS transistors being chosen for illustrative purposes. It should be understood that N-MOS, as well as JFET, transistors and other semiconductor devices, may be equally as well utilized. Transistors $Q_1$ and $Q_3$ are each utilized as an active switch. A source electrode 18a or 19a, of transistors $Q_1$ or $Q_3$, respectively, is connected to second supply bus 15 and each of drain electrodes 18b or 19b is respectively connected to an associated output terminal 20a or 20b, respectively, at which the respective electrode driving voltages $E_1$ or $E_2$ are supplied to the associated display electrode 12a or 12b. The anode of an avalanche diode $D_1$ or $D_2$ is coupled to the associated drain electrode 18b or 19b while the cathodes of the diodes are coupled to second supply bus 15. Independent signals $\phi_1$ or $\phi_2$, establishing the state of the voltage signal respectively to first electrode 12a, or second electrode 12b, are coupled between the associated gate electrode 18c of transistor $Q_1$, or gate electrode 19c of transistor $Q_3$, and the second supply bus 15.

A second transistor $Q_2$, or $Q_4$, respectively, is utilized as an active load, or current source; the gate electrode 22a or 23a and the source electrode 22b or 23b of respective transistor $Q_2$ and $Q_4$, are connected to first transistor drain electrode 18b or 19b, the anode of the associated avalanche diode $D_1$ or $D_2$, and the associated output terminal 20a or 20b, respectively. The drain electrode 22c or 23c of respective transistors $Q_2$ or $Q_4$ is coupled to first supply bus 14. For P-MOS devices, the active switching transistor $Q_1$ or $Q_3$ is an enhancement-mode device, while the active-load transistor $Q_2$ or $Q_4$ is a depletion-mode device; the voltage $V_1$ on first supply bus 14 is more negative than the voltage $V_2$ on second supply bus 15. Preferably, first supply voltage $V_1$ has a value of $-V$ volts (established by characteristics of the liquid crystal display to be driven) while second supply voltage $V_2$ has a voltage of zero (e.g. coupled to a common ground bus). It should be understood that use of N-MOS devices requires that first supply voltage $V_1$ be more positive than second supply voltage $V_2$ and that the polarity of avalanche diodes $D_1$ and $D_2$ be reversed, i.e. such that the anodes thereof are connected to second supply bus 15. Similarly, the polarity of the driving signals $\phi_1$ and $\phi_2$ must be reversed.

As previously stated hereinabove, a particular display may have a multiplicity of individually-driven electrodes, each requiring a driving circuit having: a pair of transistors with source-drain (or equivalent electrodes) circuits in series between first and second supply voltages, with a first device operating as an active load and the remaining device operating in the active-switching mode; an avalanche diode coupled across the active-switching device; and the junction between the two semiconductor devices coupled to the liquid crystal cell electrode to be driven.

The operation of the liquid crystal display driver will be described with reference to the two electrode display 11 illustrated herein. Each of input voltages $\phi_1$ and $\phi_2$ are independent of the other and, illustratively, are switched (by circuitry not shown for reasons of simplicity) between an amplitude of zero volts, which voltage tends to place the associated switching device $Q_1$ or $Q_3$, in the cut-off condition, or an amplitude which places the driven device ($Q_1$ or $Q_3$) in the saturated condition. With either of active-switching devices $Q_1$ or $Q_3$ in the saturated condition, the voltage at the associated output terminal 20a or 20b, respectively, is essentially equal to the voltage $V_2$ of the second supply bus 15 plus the saturation voltage of the associated device $Q_1$ or $Q_3$, respectively. The maximum current flowing through the drain-source circuits of devices $Q_1$ and $Q_3$, respectively, are established by the maximum source electrode currents ($I_{dss}$) of active-load devices $Q_2$ and $Q_4$, respectively.

When either of active-switching devices $Q_1$ or $Q_3$ are driven to the cut-off condition, the current flowing from the source electrode of the associated active-load transistor $Q_2$ or $Q_4$, respectively, flows through the associated avalanche diode $D_1$ or $D_2$, respectively. The avalanche voltage of each diode is established by the level of impurities added to the diode during processing, and sets the magnitude of the voltage at either driver circuit output terminal 20a or 20b, when the respective driving signal $\phi_1$ or $\phi_2$, respectively, is sufficiently positive to place the associated active-switching device in the cut-off condition.

Ideally, for a two-electrode display 11, the independent, unipolar signals driving liquid crystal display electrodes 12a and 12b are of equal magnitude and pulse width, but of alternating phase, to produce AC display excitation. If the voltages $E_1$ and $E_2$ are of unequal amplitude, pulse width or are of other than alternating phase, a DC voltage component may develop across the cell. Due to the relative simplicity of the driver circuit, requiring only a pair of three-electrode devices and an avalanche diode, the driver circuit is easily fabricated in a relatively small area upon a semiconductor chip, whereby a multiplicity of the driver circuits may be fabricated upon a single semiconductor chip, to achieve substantial equality (and, hence, matching) of: the saturation voltages of the active-switching devices; the maximum source current of the current-source devices and the avalanche voltages of the diodes. Typically, the avalanche voltage of the diodes is controlled by the level of impurities deposited therein during fabrication. The diodes may be fabricated using conventional processes utilized to fabricate depletion/enhancement-mode MOS transistors, or a separate ion implantation step may be utilized to add additional impurities to achieve the desired avalanche voltage. Thus, in the saturated condition, the device saturation voltage and, hence, electrode voltages $E_1$ and $E_2$, are substantially equal, whereby an essentially zero DC voltage appears across the liquid crystal display cell, and in the cut-off condition, the electrode voltages, each established by the associated avalanche diode at essentially equal amplitudes, impress an essentially zero DC voltage component across the cell. If the diodes do not operate in the avalanche mode (with low "on" resistance) the high resistance of the liquid crystal cell and the "cut-off resistance" of the active-load transistors $Q_2$ or $Q_4$, will form a voltage divider during alternating half cycles of the driving waveform whereby a non-zero DC voltage may appear between the display electrodes. In that case, the equalization "cut-off resistance" for both active-load devices, to prevent the occurrence of a DC drive offset voltage, is extremely difficult to achieve.

Figure 2:
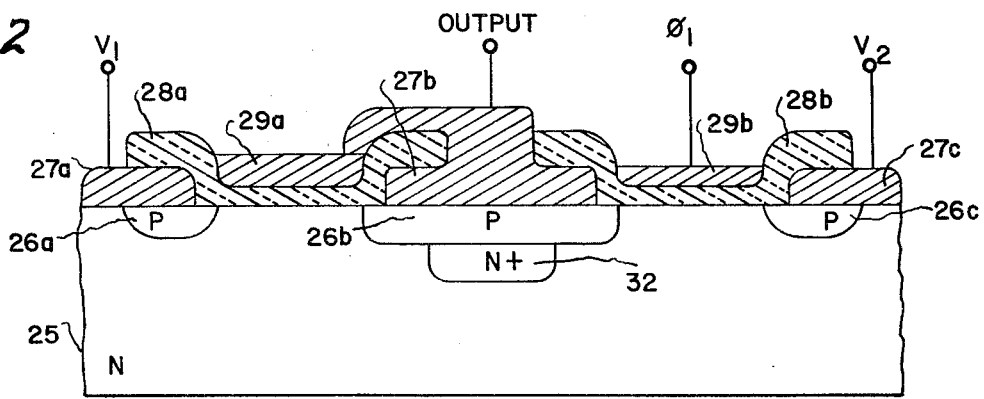
FIG. 2 is a side view of a semiconductor element having a driver circuit integrated therein.

Referring now to FIG. 2, the presently preferred P-MOS embodiment of my integratable driver circuit may be realized by fabricating each pair of MOS transistors Q1 and Q2, or Q3 and Q4, adjacent each to the other in a substrate 25 of n-type silicon. A p-type region 26a is fabricated into the substrate for the drain electrode of transistor $Q_2$. The elongated p-type region 26b forms the source electrode of transistor $Q_2$ and the drain electrode of transistor $Q_1$. A third p-type region 26c forms the source electrode of transistor $Q_1$. Suitable conductive material patterns 27a, 27b and 27c are applied, as by masking and the like known methods, to form contacts respectively for the $Q_2$ drain, $Q_2$ source-$Q_1$ drain and $Q_1$ source electrodes. An insulated layer, e.g. an oxide of the semiconductor material of the substrate, is grown with a first portion 28a thereof covering $Q_2$ drain contact 27a and extending across the substrate surface to the $Q_2$ source-$Q_1$ drain (output) contact 27b; a second portion 28b covers the $Q_1$ source contact 27c, the substrate surface between contacts 27c and 27b, and a portion of contact 27b, leaving a "dig-down" aperture to allow connection to contact 27b. A conductive layer 29a is deposited upon the surface of insulative portion 28a to form the $Q_2$ gate electrode; layer 29a extends along the insulator surface to connect with contact portion 27b, whereby the $Q_2$ gate and source electrodes are connected together and to the $Q_1$ drain electrode. A separate conductive layer 29b is deposited on the surface of insulative portion 28b to form the gate electrode of transistor $Q_1$.

A buried region 32 of n+-type semiconductor is fabricated, as by ion implantation and the like processes, beneath p-type region 26b to facilitate avalanche breakdown between regions 32 and 26b at an avalanche voltage determined by the level of n-type impurities in layer 32, relative to the p-type impurities in source-drain region 26b. Typically, in the preferred P-MOS embodiment described hereinabove, the p-type source-drain region 26b is degenerate, e.g. having about $10^{20}$ impurities per cubic centimeter, and, as the avalanche region is determined by that region having the lowest concentration of impurities, n+-type region 32 is doped, e.g. by ion implantation, with impurities to a level from about $10^{16}$ to about $10^{17}$ impurities per cubic centimeter, when substrate 25 is doped with n-type impurities to a level on the order of $10^{14}$ impurities per cubic centimeter. Thus, the avalanche diode is formed within the area dedicated to the pair of semiconductor devices utilized for the active switching transistor $Q_1$ and the active current source transistor $Q_2$, whereby minimum semiconductor area is required and a relatively high density of driver circuits may be integrated on a chip of relatively small area.

While one preferred embodiment of the present invention has been described herein, many variations and modifications will now become apparent to those skilled in the art. It is my intent, therefore, to be limited not by the specific embodiment disclosed herein, but only by the scope of the appending claims.

What is claimed is:

1. An integratable circuit for driving a load, comprising:
   first and second bus means for coupling respectively to first and second electrical potentials;
   an output terminal for coupling said circuit to said load;
   a first semiconductor device having first, second and third electrodes; said first electrode being coupled to said first bus means and said second and third electrodes being coupled together and to said output terminal to cause a substantially constant current to flow from said first electrode towards said output terminal;
   a second semiconductor device having first, second and third electrodes, with the magnitude of the impedance between said first and second electrodes being established by the magnitude of a voltage impressed between said second and third electrodes; said first and second electrodes being respectively coupled to said output terminal and said second bus means respectively; said third electrode receiving a voltage sufficient to reduce the impedance between said first and second electrodes for selectively causing substantially all of said substantially constant current to be conducted to said second bus means through said second semiconductor device responsive only to a first condition; and
   an avalanche diode coupled between said output terminal and said second bus means for establishing an essentially constant voltage therebetween only when said second semiconductor device responds to a condition other than said first condition and does not conduct substantial current toward said second bus means.

2. The driver circuit of claim 1, wherein said first and second devices are transistors.

3. The driver circuit of claim 2, wherein said transistors are of the MOS type.

4. The driver circuit of claim 3, wherein said transistors are both P-MOS transistors.

5. The driver circuit of claim 4, wherein said first device is a depletion-mode device and said second device is an enhancement-mode device.

6. In combination, a plurality of the driver circuits of claim 1, integrally fabricated in a single member of semiconductor material; each driver circuit having said first and second semiconductor devices being MOS transistors fabricated with a first type of semiconductor region forming each of the first and second electrodes thereof, the first electrode semiconductor region of the second device and the second electrode semiconductor region of the first device forming a single integral electrode region; said avalanche diode of each driver circuit being fabricated as a heavily doped region of the opposite type of semiconductor material underlying said single integral electrode region of that driver circuit.

7. In combination, a plurality of the driver circuits of claim 1, integrally fabricated in a single member of semiconductor material; each driver circuit having said first and second semiconductor devices being MOS transistors fabricated with a first type of semiconductor region forming each of the first and second electrodes thereof, the first electrode semiconductor region of the second device and the second electrode semiconductor region of the first device forming a single integral electrode region; said avalanche diode of each driver circuit being fabricated as a heavily doped region of the opposite type of semiconductor material underlying said single integral electrode region of that driver circuit; and a liquid crystal display having a like plurality of independently energizable electrodes; each electrode of said liquid crystal display being coupled to an output terminal of one of said plurality of driver circuits.

* * * * *